United States Patent
Wolff

[15] 3,660,843
[45] May 2, 1972

[54] RECOVERY SYSTEM
[72] Inventor: Hanns H. Wolff, Orlando, Fla.
[73] Assignee: The United States of America as represented by the Secretary of the Navy
[22] Filed: Aug. 31, 1970
[21] Appl. No.: 68,281

[52] U.S. Cl. ........................................... 343/18 C, 343/18 D
[51] Int. Cl. ........................................................ H01q 15/20
[58] Field of Search ........................................ 343/18 C, 18 D

[56] References Cited
UNITED STATES PATENTS
2,432,984  12/1947  Budenbom .......................... 343/18 D
3,417,398  12/1968  Lewis et al. .......................... 343/18 C Primary Examiner—T. H. Tubbesing
Attorney—Richard S. Sciascia, John W. Pease and Harvey A. David

[57] ABSTRACT

A personnel locating and recovery system utilizes a radar corner reflector comprising a flexible membrane or diaphragm which is actuable by voice to modulate radar energy reflected toward a searching radar equipped to detect the modulation for recognition and identification purposes. In a preferred embodiment the reflector is foldable to pocket size.

8 Claims, 3 Drawing Figures

PATENTED MAY 2 1972  3,660,843
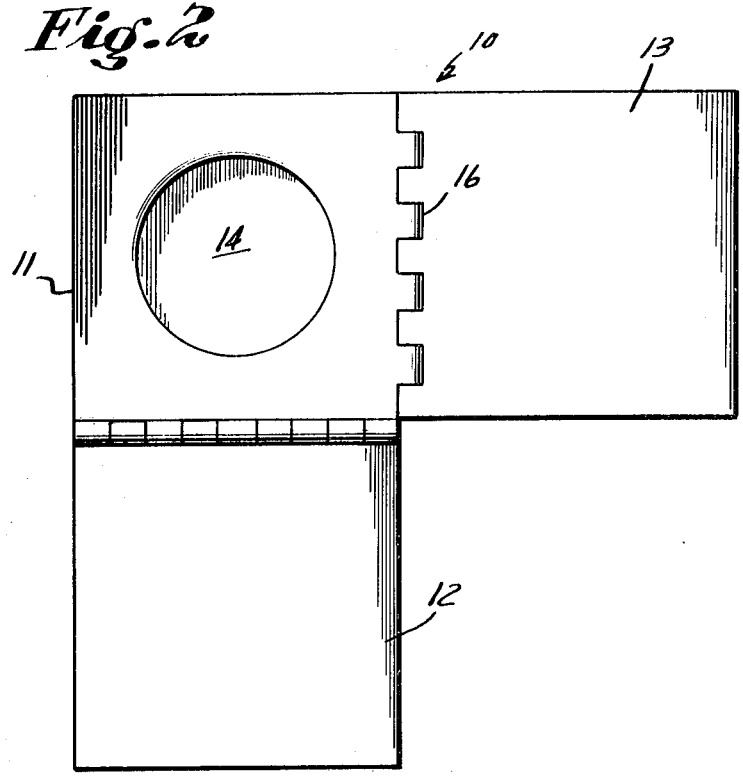
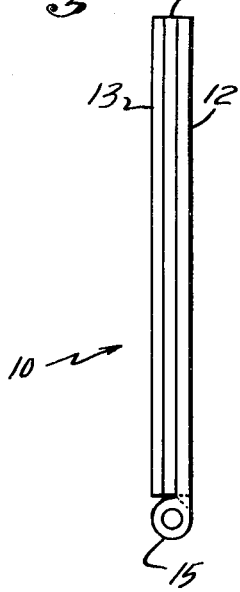
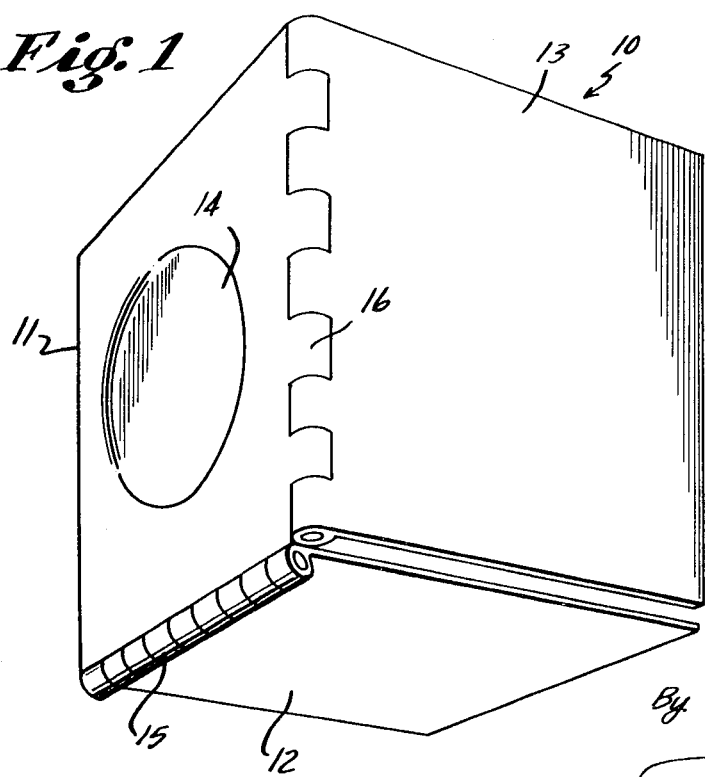
Hanns H. Wolff
INVENTOR
By Harvey A. David
John M. Pierce
Attorneys

RECOVERY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The recognition and localization of personnel such as downed aircraft pilots, especially in a war zone, has been a continual problem. Release of flares, if at all available to the personnel to be rescued, has often been unsuccessful mainly due to the fact that flare life is rather limited. Beacons of any kind are usually not available. Therefore, rescue very often is a matter of chance.

The use of radar reflectors to aid in localization of personnel has been proposed, but use in a war zone has not heretofore been considered practical because of inability of the personnel to provide identification as being friendly.

SUMMARY OF THE INVENTION

The present invention relates to a recovery system which is both simple and reliable. According to this invention the personnel to be rescued is equipped with a corner reflector and the area in which the personnel is expected to be located is scanned by a preferably continuous wave radar system which may scan the area by a pencil beam, preferably in a spiral scan.

The personnel to be rescued exposes the corner reflector and an airborne rescue radar is used to localize the position of the corner reflector. The center of the spiral scan is then adjusted, such that the corner reflector return appears in the center and the excursion of the spiral scan is reduced to a minimum excursion, preferably by an automatically controlled point lock-on to the corner reflector.

According to a further feature of this invention, a part of one of the sides of the corner reflector contains a membrane or diaphragm against which the personnel to be rescued can speak and thereby modulate the return beam. The reflected, voice modulated radar beam is demodulated in the aircraft and provides recognition of the personnel to be rescued, thereby avoiding traps.

According to a still further feature of this invention, the corner reflector is foldable and can be carried easily in a pocket.

BRIEF DESCRIPTION OF THE DRAWINGS

FIG. 1 is a perspective view of a preferred embodiment of corner reflector according to this invention;

FIG. 2 is a plan view of the reflector of FIG. 1, but with parts shown in different positions; and FIG. 3 is a side elevation of the reflector when in a folded condition.

DESCRIPTION OF THE PREFERRED EMBODIMENT

In the form of the invention illustrated in the drawings and described hereinafter, there is provided a corner reflector 10 comprising a first rectangular plate 11 which holds two other rectangular plates, 12 and 13, by means of hinges 15 and 16. The plates 11, 12, and 13, which are preferably square, are formed of any suitable rigid material presenting surfaces which are reflective to the energy of a radar beam. For example, they may be formed of foil covered cardboard, metalized or plated plastic, or metal such as aluminum or copper.

The plate 11 is, furthermore, equipped with a diaphragm or membrane 14. The membrane 14 may be formed of metal foil in the case where the plates are formed of foil covered cardboard, or may be an area of reduced thickness in the cases of metalized plastic or metal plates.

The hinges 15 and 16 are arranged, as is best shown in FIG. 2, at neighboring edges of the plate 11 such that the plates 12 and 13 can either be unfolded to form, together with plate 11, a corner reflector as shown in FIG. 1; or can be folded, as shown in FIG. 3, to a flat package which can easily be carried. At least one of the hinges is arranged such that it can fold in both directions so that plates 12 and 13 can be folded to lie against opposite sides of plate 11, therefore providing protection for the diaphragm 14.

When it is desired to use the reflector 10, the plates 12 and 13 are moved about the axes of the hinges 15 and 16 to positions wherein the plates 12 and 13 each define a right angle with the plate 11 and also define a right angle between one another. In this condition, wherein reflective surfaces of the plates are on the inside of the corner reflector, radar energy beamed into the reflector will be redirected along a return path toward the radar transmitter irrespective of the position or attitude of the reflector in a well known manner characteristic of corner reflectors. Because of this characteristic, aiming of the device to reflect the energy back along the direction from which it came is neither difficult nor critical.

The device is conveniently held with the diaphragm in front of the user's mouth so that when he speaks, his vocalizations cause movements of the diaphragm or membrane 14 in the plate 11. These movements effect modulation of the reflected radar beam, and the modulated beam can be processed at the radar receiver to detect the information impressed thereon by the user of the reflector 10. In the case of personnel sought to be recovered from a war zone, the information could include a code word or the like identifying the personnel as friendly, whereby traps can be avoided.

Obviously many modifications and variations of the present invention are possible in the light of the above teachings. It is therefore to be understood that within the scope of the appended claims the invention may be practiced otherwise than as specifically described.

What is claimed is:

1. A device for use in aiding in the recognition and localization of personnel, said device comprising:
    a radar corner reflector having a plurality of plane, radar reflective surfaces disposed at right angles to one another;
    at least part of one of said surfaces being presented by a flexible membrane which is movable in response to vocalizations to modulate radar energy being reflected by said corner reflector.

2. A device as defined in claim 1, and wherein:
    said corner reflector comprises a plurality of plates presenting said reflective surfaces; and
    said membrane is as by one of said plates.

3. A device as defined in claim 2, and wherein:
    said plurality of plates comprises first, second, and third plates;
    said device further comprising means for connecting said plates together in extended positions in which the reflective surfaces of second and third plates each define a right angle with the reflective surface of said first plate, and in which the reflective surfaces of said second and third plates define a right angle with one another.

4. A device as defined in claim 3, and wherein:
    said plates are rectangular; and
    said means for connecting said plates together comprises hinge means whereby said plates can be folded from said extended positions into a flat condition.

5. A device as defined in claim 4, and wherein:
    said plates are square.

6. A device as defined in claim 5, and wherein:
    said hinge means comprises first hinge means hingedly connecting one edge of said first plate to one edge of said second plate, and second hinge means hingedly connecting a neighboring edge of said first plate to one edge of said third plate.

7. A device as defined in claim 6, and wherein said membrane is comprised of part of said first plate.

8. A device a defined in claim 7, and wherein:

said second plate is movable about the axis of said first hinge from said extended position thereof to a position lying substantially flat against one surface of said first plate; and said third plate is movable about the axis of said second hinge from said extended position thereof to a position lying substantially flat against the opposite surface of said first plate.

* * * * *